(12) United States Patent
Yao

(10) Patent No.: US 12,538,498 B2
(45) Date of Patent: Jan. 27, 2026

(54) MEMORY DEVICE IMPLEMENTING UNIFIED MEMORY ARCHITECTURE INTEGRATING MULTIPLE MEMORY TYPES

(71) Applicant: Integrated Silicon Solution, (Cayman) Inc., Grand Cayman (KY)

(72) Inventor: ChungTing Yao, Saratoga, CA (US)

(73) Assignee: Integrated Silicon Solution, (Cayman) Inc., Grand Cayman (KY)

( * ) Notice: Subject to any disclaimer, the term of this patent is extended or adjusted under 35 U.S.C. 154(b) by 629 days.

(21) Appl. No.: 18/052,775

(22) Filed: Nov. 4, 2022

(65) Prior Publication Data

US 2024/0155850 A1 May 9, 2024

(51) Int. Cl.
*H10B 99/00* (2023.01)

(52) U.S. Cl.
CPC .................................. *H10B 99/00* (2023.02)

(58) Field of Classification Search
CPC ........ H10B 99/00; H10B 61/22; H10B 20/65; G11C 17/16; G11C 17/18; G11C 11/1659; G11C 11/1673; G11C 11/005
USPC ...................................................... 365/189.2
See application file for complete search history.

(56) References Cited

U.S. PATENT DOCUMENTS

| | | | |
|---|---|---|---|
| 8,760,920 B2 | 6/2014 | Kim et al. | |
| 9,552,859 B2 | 1/2017 | Roy et al. | |
| 9,954,030 B2 | 4/2018 | Lee et al. | |
| 10,438,998 B2 | 10/2019 | Lee et al. | |
| 10,964,367 B1 | 3/2021 | Jaiswal et al. | |
| 2017/0331031 A1* | 11/2017 | Bak | H01L 24/82 |

FOREIGN PATENT DOCUMENTS

CN    107665892 A  *  2/2018  ............. H10D 88/00

OTHER PUBLICATIONS

Yu-Der Chih et al., "A 22nm 32Mb Embedded STT-MRAM with 10ns Read Speed, 1M Cycle Write Endurance, 10 Years Retention at 150° C. and High Immunity to Magnetic Field Interference," 2020 IEEE International Solid-State Circuits Conference—(ISSCC), 2020, pp. 222-224, doi: 10.1109/ISSCC19947.2020.9062955.

Guenole Jan et al., "Demonstration of an MgO based anti-fuse OTP design integrated with a fully functional STT-MRAM at the Mbit level," 2015 Symposium on VLSI Technology (VLSI Technology), 2015, pp. T164-T165, doi: 10.1109/VLSIT.2015.7223663.

* cited by examiner

*Primary Examiner* — Fernando Hidalgo

(57) ABSTRACT

A semiconductor memory device is formed on a semiconductor substrate including a first memory region, a second memory region and a logic region. A flash memory array is formed in the first memory region and includes an array of magnetoresistive random-access (MRAM) memory cells, each MRAM memory cell including an access transistor coupled to a magnetic tunnel junction (MTJ) storage element. A read-only (ROM) memory array is formed in the second memory region and includes an array of read-only (ROM) memory cells, each ROM memory cell including an access transistor coupled to a short or open circuit as the ROM storage element. A memory peripheral circuit is formed in the logic region. The memory peripheral circuit includes control circuits for receiving input commands and executing memory operations to the memory cells in the flash memory array and the read-only memory array.

20 Claims, 6 Drawing Sheets

MEMORY DEVICE IMPLEMENTING UNIFIED MEMORY ARCHITECTURE INTEGRATING MULTIPLE MEMORY TYPES

FIELD OF THE INVENTION

The invention relates to memory devices and, in particular, to a memory device that integrates multiple memory types using a unified memory architecture.

BACKGROUND OF THE INVENTION

A computing system typically includes various types of memories to store computer codes and to store processed data for execution by the central processing unit (CPU). As is known in the industry, a memory can be classified as non-volatile memory or volatile memory. A non-volatile memory will retain data even if the applied power is turned off, while a volatile memory will lose its stored data when the applied power is turned off. Commonly used non-volatile memories include flash memory, EEPROM, OTP or MTP memory and mask ROM. Commonly used volatile memories include SRAM and DRAM. FIG. 1 illustrates a conventional memory system implemented in a computing system in some examples. A computing system may include a read-only memory (ROM) 12 to store fixed computer codes. Fixed codes are computer codes that will not be changed throughout the product lifetime. Examples of fixed codes are the boot code or matured, market proven computer codes which do not change over the product lifetime. The computing system may further include a non-volatile memory 10, such as a flash memory, for storing variable computer codes that can be changed over the product lifetime. Variable computer codes can be software code changes made during development of the computing system or software codes for field upgrade of the product. During computing operation, the CPU uses either the fixed codes or the variable codes, but does not used both fixed and variable codes simultaneously. A selector 16 in FIG. 1 illustrates the selection of either the fixed codes from the ROM device 12 or the variable codes from the flash memory device 10 for execution by the CPU. Each of flash memory device 10 and ROM device 12 includes its own peripheral circuits for interfacing with the CPU, such as to receive incoming commands and to provide read out data.

In the conventional computing system, sometimes a separate ROM module is used for storing the fixed codes. The flash memory can be either an embedded flash in the central processing unit of the computing system or a discrete flash device. Conventional ROM device 12 and the flash memory device 10 are semiconductor devices fabricated using dedicated processes and are structurally different. For example, the ROM device may be fabricated using the same logic device fabrication process as the CPU with a single mask defining the data (the fixed codes) to be stored in the ROM device. In other examples, the flash memory device can be an EEPROM, which can be randomly accessed, or a NOR flash, which is read or programmed sequentially for a whole sector, or NAND flash, which is accessible in blocks and not randomly accessible.

The computing system may include other types of memories, such as one-time programmable (OTP) memories or multiple-time programmable (MTP) memories. An OTP memory is written once to store data that will remain unchanged for the product lifetime. An MTP memory can be written and read multiple times, such as 100 times, over the lifetime of the product. OTP memories are useful in applications such as storing trimming code, revision code, vendor identification, user specific code (e.g., a logo), or for production lot tracing. OTP or MTP memories may also have applications in storing configuration data for system hardware, for example, operation mode selection (for instance, general purpose input/output (GPIO) mode selection) or for storing fixed, matured computer codes. This information needs to be programmed one-time, remain non-volatile within the product lifetime, and immune to external interference, that is, immune to noise, EMI, or magnetic field interference. Examples of OTP memories include laser fuse, electrical fuse (eFuse), and antifuse.

Magnetoresistive random-access memory (MRAM) is a type of non-volatile random-access memory which stores data in magnetic domains. In particular, a MRAM device stores data in magnetic storage elements where the resistance of the magnetic storage elements changes as a function of the magnetic state. In particular, the magnetic storage element may have high and low resistance states associated with different magnetic states which can be used to encode two logical states, such as logical "0" and logical "1". In addition, because the magnetic orientation of the magnetic storage element remains without applied electrical power to the element, the magnetic storage element can be used to form a non-volatile data memory.

SUMMARY OF THE INVENTION

In embodiments of the present invention, a non-volatile memory device is formed by a semiconductor substrate including a first memory region, a second memory region and a logic region. A flash memory array is formed in the first memory region. The flash memory array includes an array of magnetoresistive random-access (MRAM) memory cells, and each MRAM memory cell includes an access transistor coupled to a magnetic tunnel junction (MTJ) storage element. A read-only memory array is formed in the second memory region. The read-only memory array includes an array of read-only (ROM) memory cells, each ROM memory cell includes an access transistor coupled to a short or open circuit as the ROM storage element. A memory peripheral circuit is formed in the logic region. The memory peripheral circuit includes control circuits for receiving input commands and executing memory operations to the memory cells in both memory arrays.

These and other advantages, aspects and novel features of the present invention, as well as details of an illustrated embodiment thereof, will be more fully understood from the following description and drawings.

BRIEF DESCRIPTION OF THE DRAWINGS

Various embodiments of the invention are disclosed in the following detailed description and the accompanying drawings. Although the drawings depict various examples of the invention, the invention is not limited by the depicted examples. It is to be understood that, in the drawings, like reference numerals designate like structural elements. Also, it is understood that the depictions in the FIGS. Are not necessarily to scale.

DETAILED DESCRIPTION OF THE INVENTION

In embodiments of the present invention, a semiconductor memory device implements a unified memory architecture to integrate multiple, non-volatile memory types into a single non-volatile memory device. More specifically, the memory device uses the memory cell array structure and the basic fabrication process of a magnetoresistive random-access memory (MRAM) memory array and simple masking customization to form flash memory cells and read-only memory (ROM) memory cells. In some embodiments, the memory device may also integrate one-time programmable (OTP) memory cells. In one embodiment, the memory device includes a MRAM memory array which is partitioned into a MRAM region of flash memory cells and a ROM region of read-only memory cells. In the fabrication process, a magnetic layer mask is used to define the MRAM region of memory cells and the ROM region of memory cells and a via mask is used to define the read-only data content of the ROM region.

In embodiments of the present disclosure, the memory device uses MRAM for the flash memory cells, which replaces traditional NOR flash devices or EEPROM devices. MRAM memory array realizes advantages over other traditional flash memory devices in that MRAM memory can be randomly accessible, similar to EEPROM. The MRAM memory array also has faster read and program (write) speed as compared to the traditional flash memory devices with much less power consumption per memory transaction. Furthermore, when the MRAM array structure is converted to ROM memory cells, the ROM memory cells thus formed is immune to external magnetic field influence, which ensures data security. For instance, functional safety backup code can be stored in the ROM region of the memory device.

Figure 2:
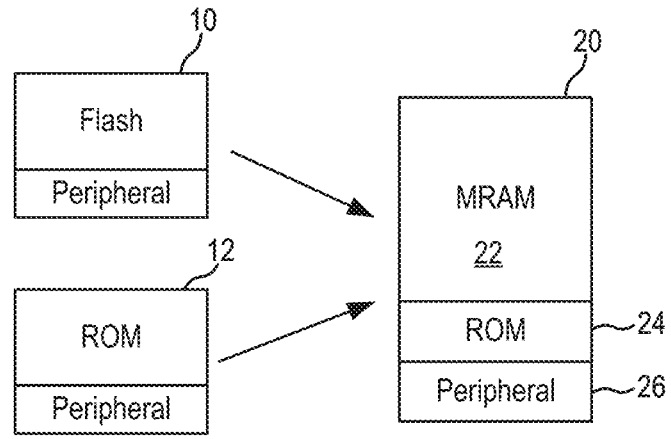
FIG. 2 illustrates a memory device implementing the unified memory architecture of the present invention to incorporate two different types of non-volatile memories, such as flash and ROM memories, in embodiments of the present invention.

FIG. 2 illustrates a memory device implementing the unified memory architecture of the present invention to incorporate two different types of non-volatile memories, such as flash and ROM memories, in embodiments of the present invention. Referring to FIG. 2, a memory device 20 implements the unified memory architecture of the present invention to combine a flash memory device 10 and a read-only memory device 12 into a monolithic memory device. The memory device 20 implements a MRAM memory array which is configured by a magnetic layer mask into a first region 22 of MRAM memory cells and a second region 24 of ROM memory cells and a via mask to define the read-only data of the ROM memory cells. The MRAM memory cells and the ROM memory cells share the same memory peripheral circuit 26 for controlling the memory operations on the memory cells and for interfacing with an external host.

Figure 3:
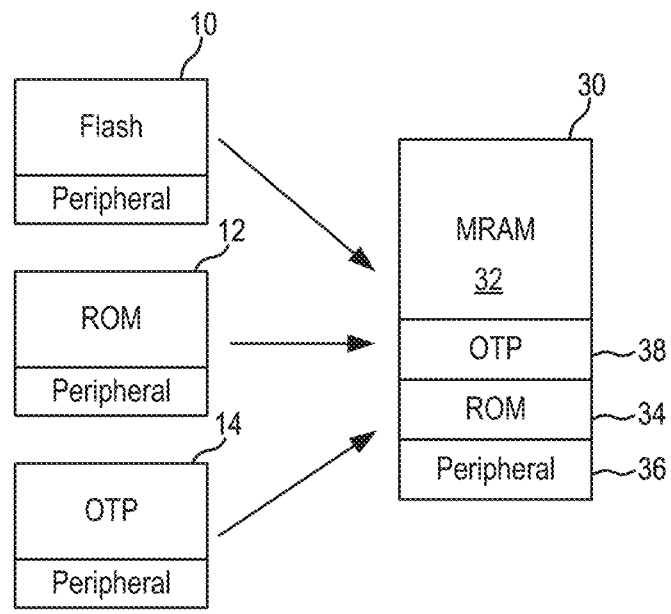
FIG. 3 illustrates a memory device implementing the unified memory architecture of the present invention to incorporate three different types of non-volatile memories, such as flash, ROM and OTP memories, in embodiments of the present invention.

FIG. 3 illustrates a memory device implementing the unified memory architecture of the present invention to incorporate three different types of non-volatile memories, such as flash, ROM and OTP memories, in embodiments of the present invention. Referring to FIG. 3, a memory device 30 implements the unified memory architecture of the present invention to combine a flash memory device 10, a read-only memory device 12, and a one-time programmable memory device 14, into a monolithic memory device. The memory device 30 implements a MRAM memory array which is configured by a magnetic layer mask into a first region 32 of MRAM memory cells and a second region 34 of ROM memory cells and a via mask to define the read-only data of the ROM memory cells. A third region 38 can be defined for use as OTP memory cells. In practice, the third region 38 contains MRAM memory cells designated for use as one-time programmable memory cells. Application of a sufficiently high voltage to the MRAM memory cell causes dielectric break down and shorting of the magnetic storage element, which render the MRAM memory cell stuck at a given state and thereby converting a MRAM memory cell to an OTP memory cell. The MRAM memory cells, the ROM memory cells and the OTP memory cells share the same memory peripheral circuit 36 for controlling the memory operations on the memory cells and for interfacing with an external host.

Figure 1:
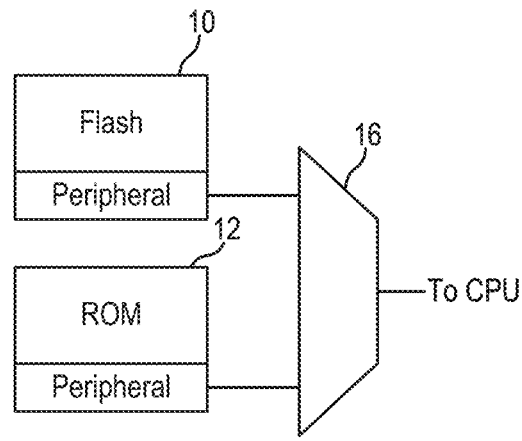
FIG. 1 illustrates a conventional memory system implemented in a computing system in some examples.

A salient feature of the memory device of the present invention, such as the memory devices 20 and 30 of FIGS. 2 and 3, is that different memory types in the monolithic memory device use the same memory peripheral circuit. In the present description, the memory peripheral circuit includes the memory array control circuits and interface circuits for communication with the host. In the conventional system (FIG. 1), each separate memory type has its own peripheral circuit to which the CPU communicates. In embodiments of the present invention, a monolithic memory device combines different memory types where the different memory types use a single shared memory peripheral circuit for read-write control and for communication with the host. When applied in a computing system, the CPU accesses the memory cells of the memory device of the present invention through the single shared memory peripheral circuit, regardless of the types of memory data the CPU is attempting to retrieve. As described above, a computing system may include different memory types but the CPU does not access the different memory types at the same time. In operation, the CPU only accesses one memory type at a time to retrieve either variable computer codes or fixed computer codes. The unified memory architecture of the present invention allows a monolithic memory device to be built to replace multiple separate memory devices. As such, the CPU only needs to interface with a single memory peripheral circuit, which has the advantageous effect of reducing system cost and simplifying the system design.

In the present description, magnetoresistive random-access memory (MRAM) refers to a non-volatile random-access memory that stores data in magnetic domains. In some examples, a MRAM device store data in magnetic storage elements where the resistance of the magnetic storage elements changes as a function of the magnetic state. In some examples, the magnetic storage element is a magnetic tunnel junction (MTJ) storage element. In one example, a MRAM memory cell is formed by one access transistor connected to one MTJ storage element. The MTJ storage element includes two ferromagnetic layers, each of which can hold a magnetization, separated by a thin, non-magnetic insulating layer, also referred to as a tunnel barrier layer. The first ferromagnetic layer, sometimes referred to as a magnetic reference layer, has a magnetization that is fixed to a particular polarity, such as being perpendicular to the plane of the magnetic reference layer. The second ferromagnetic layer, also referred to as a magnetic free layer, has a magnetization that can be changed in response to an applied electric field to store memory data. In some examples, the magnetization of the magnetic free layer can be oriented in one of two directions that are both generally perpendicular to the plane of the magnetic free layer. In particular, the magnetization of the magnetic free layer can be either parallel with the magnetization of the magnetic reference layer or anti-parallel with (or opposite to) the direction of magnetization of the magnetic reference layer. In some examples, the switching of the magnetization direction in the MTJ storage element can be driven by electron spin transfer.

The MTJ storage element has low and high resistance states associated with the orientation of the magnetization of the magnetic free layer and the magnetic reference layer, where the low and high resistance states can be used to encode two logical states, such as logical "0" and logical "1." In some examples, the electrical resistance through the MTJ storage element in a direction perpendicular to the planes of the ferromagnetic layers changes with the relative orientations of the magnetizations of the magnetic reference layer and magnetic free layer. When the magnetization of the magnetic free layer is oriented in the same direction as the magnetization of the magnetic reference layer, the electrical resistance through the MTJ storage element is at its lowest electrical resistance state. Conversely, when the magnetization of the magnetic free layer is in a direction that is opposite to that of the magnetic reference layer, the electrical resistance across the MTJ storage element is at its highest electrical resistance state. The low and high resistance states are used to encode a bit of memory data. For example, the low resistance state can be read as a logical "0", whereas the high resistance state can be read as a logical "1". In addition, because the magnetic orientation of the magnetic free layer remains in its switched orientation even when no electrical power is applied to the MTJ storage element, the MTJ storage element realizes a robust, non-volatile data memory bit.

Figure 4:
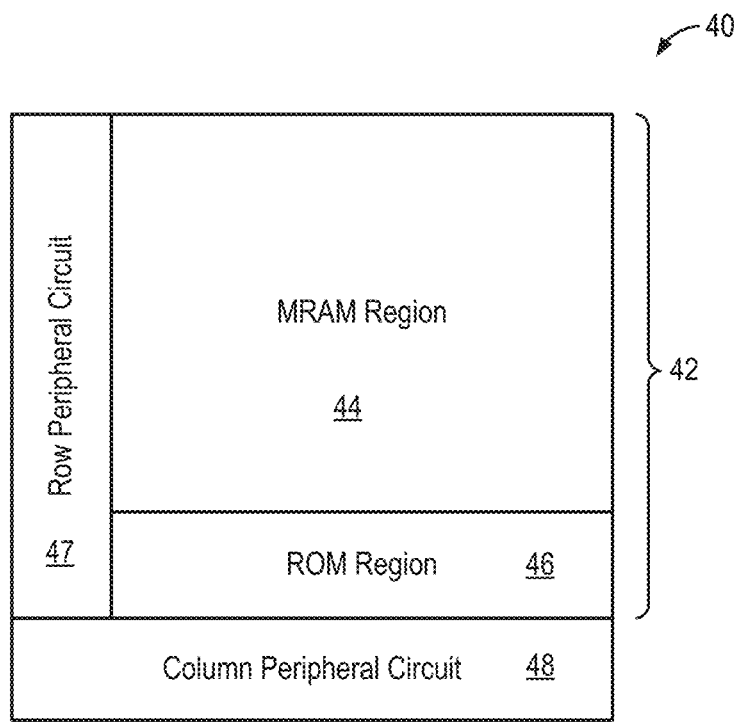
FIG. 4 is a schematic diagram of a memory device constructed using the unified memory architecture to incorporate different types of non-volatile memories in embodiments of the present invention.

FIG. 4 is a schematic diagram of a memory device constructed using the unified memory architecture to incorporate different types of non-volatile memories in embodiments of the present invention. Referring to FIG. 4, a memory device 40 includes a memory array 42 that is constructed using MRAM memory cell technology. That is, the memory array 42 is fabricated using a basic MRAM fabrication process. The memory array 42 is partitioned into a MRAM region 44 of non-volatile MRAM memory cells and a ROM region 46 of read-only memory cells. The memory array partition is accomplished by the use of two masks to customize the memory array 42 into the different memory regions as well as to program the desired read-only data into the ROM region 46.

In the present embodiment, the memory array 42 are arranged in a two-dimensional array of memory cells that are connected with word lines and bit lines. The memory cells are connected to a source-line to provide read and write currents to the memory cells, while the individual memory cells are selected by a selected word line and a selected bit line.

The memory device 40 includes a memory peripheral circuit for accessing the memory array 42 for performing memory operations, such as read, erase and write (program) operations, and also for interfacing with an external host. In the present illustration, the memory peripheral circuit includes a row peripheral circuit 47 and a column peripheral circuit 48. It is instructive to note that the same memory peripheral circuit is used to access both types of memories in the memory array 42. That is, the MRAM memory cells and the ROM memory cells are both accessed through the same memory peripheral circuit.

In operation, the memory device 40 receives input commands from the host to read data from or to write (program) data to the memory array 42 to specific memory addresses. In case of a write command, the memory device 40 also receive write data to be written to the memory array 42. The memory device 40 provides read data as output in response to a read command or a write completion as output in response to a write command. In some embodiments, the row peripheral circuit 47 includes the row address decoders, also refer to as the word line decoders, for decoding the word line address to select certain word lines and word line drivers for driving and activating the selected word lines. In some embodiments, the column peripheral circuit 48 includes the column address decoders, also referred to as the bit line decoders, for decoding the bit line address to select certain bit lines, bit line drivers for driving write data into the memory array, and sense amplifiers for sensing read out data from the selected memory cells. It is understood that the memory device 40 may include other circuitry in the memory peripheral circuits, such as bias voltage sources, precharge circuits, data buffers and interface circuits, to complete the memory device. The specific construction of the memory peripheral circuit in the memory device 40 is not critical to the practice of the present invention.

It is imperative to note that the write and read operations of memory device 40 does not change with the integration of the ROM region into the MRAM-based memory array 42. In operation, when reading from the MRAM memory cells, the sense amplifier senses the low resistance value (RL) or the high resistance value (RH) of the MTJ storage element. Meanwhile, when reading from the ROM memory cells, the sense amplifier senses an open (very high resistance $R_\infty$) or a short connection (very low resistance R0) in the ROM storage element. The sensing of the ROM memory cell data therefore provides a wider and easier sensing margin than the MTJ memory cell data and the same sense amplifier circuit can be used to read out memory cell data from both types of memory cells.

Figure 5:
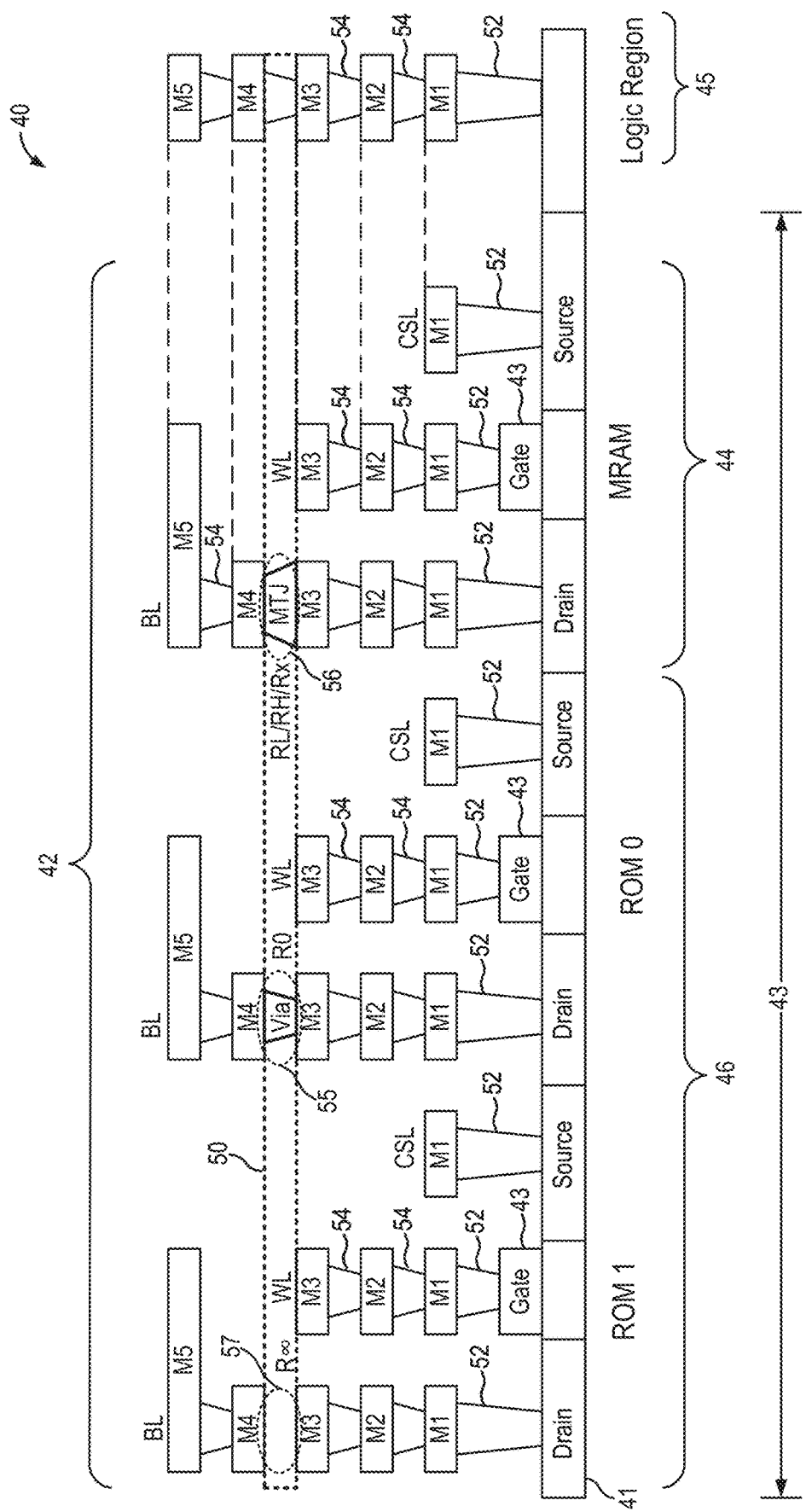
FIG. 5 is a cross-sectional view of a memory device illustrating the integration of multiple memory types using the unified memory architecture in embodiments of the present invention.

The construction of the memory device 40 and the integration of different memory types into a MRAM memory array will now be described in more details. FIG. 5 is a cross-sectional view of a memory device illustrating the integration of multiple memory types using the unified memory architecture in embodiments of the present invention. Referring to FIG. 5, according to embodiments of the present invention, the unified memory architecture enables different memory types to be formed in the memory device 40 using the same fabrication process, with customization of the memory types and read-only memory data content using two simple masking steps. In the present embodiment, the memory device 40 is fabricated using a given MRAM fabrication process. In one example, the memory device 40 is fabricated using a MRAM fabrication process which forms MRAM memory cells using a CMOS-compatible back-end-of-the-line (BEOL) memory fabrication process, such as the MRAM fabrication process described in Yu-Der Chih et al., "A 22 nm 32 Mb Embedded STT-MRAM with 10 ns Read Speed, 1M Cycle Write Endurance, 10 Years Retention at 150° C. and High Immunity to Magnetic Field Interference," 2020 IEEE International Solid-State Circuits Conference (ISSCC), 2020, pp. 222-224, doi: 10.1109/ISSCC19947.2020.9062955. In embodiments of the present invention, the use of the MRAM fabrication process described in the Chih's paper is illustrative only and not intended to be limiting. The unified memory architecture of the present invention can be implemented using other MRAM fabrication processes, presently known or to be developed.

In the present embodiment, the memory device 40 includes, on a semiconductor substrate 41, a region 43 for forming a memory array 42 and a region 45 for forming logic circuits. In the present description, the logic region 45 refers to the region in which the peripheral circuit is formed, such as the row peripheral circuit 47 and the column peripheral circuit 48 of FIG. 4. The detail construction of the logic region 45 is not critical to the practice of the present invention and will not be described in detail. It is instructive to note that the logic region 45 includes circuit elements, such as transistors, that are interconnected by conductive lines to construct circuitry of the peripheral circuit for controlling the memory cells or implementing the memory operations in the memory cells of the memory array 42. The logic region 45 may include digital and analog circuitry, such as address decoders, voltage sources and driver circuits. As illustrated in FIG. 5, the circuitry may be interconnected by metal layers formed in multiple planes, such as metal 1 layer (M1) to metal 5 layer (M5). A metal layer in one plane is isolated from the metal layers in the other planes by an interlayer dielectric layer and the metal layers are interconnected across the multiple planes by contacts 52 and vias 54. The illustration of the logic region 45 in FIG. 5 is representative only and is not intended to depict actual circuit construction.

In the memory array 42, each memory cell includes one access transistor and one storage element. To form the access transistors of the memory cells, source and drain regions are formed in the semiconductor substrate 41. A gate conductive layer 43 is formed on and isolated from the semiconductor substrate 41 by a gate dielectric layer (not shown) and is patterned to form the gate electrode of the access transistor in each memory cell. Each gate electrode is formed between respective source and drain regions. Various metal layers in multiple planes, denoted as metal layers M1, M2, M3, M4 and M5 and associated contacts 52 and vias 54 are used to connect the memory cells to circuit elements in the memory array, such as word lines, bit lines, and source lines. In particular, the source regions of the memory cells are connected to respective common source lines (CSL) formed in the first metal layer M1 through contacts 52. The drain regions of the memory cells are connected to one terminal of the storage element which is formed between metal layers M3 and M4. The bit lines (BL) are formed in the fifth metal layer M5 and each bit line is connected to the other terminal of the respective storage element. In embodiments of the present invention, the memory array 42 may include different memory types and the storage elements can include a MTJ storage element to form a MRAM memory cell, a conductive via or lack of (or the absence of) a conductive via to form a ROM memory cell, as will be explained below.

FIG. 5 depicts three exemplary memory cells in the memory array 42 to illustrate the application of the unified memory architecture of the present invention to form different memory types using the same fabrication process. More specifically, FIG. 5 illustrates a ROM memory cell patterned to a logical "1" value ("ROM 1") and a ROM memory cell patterned to a logical "0" value ("ROM 0"), both formed in the ROM region 46 of the memory device 40. FIG. 5 further illustrates a MRAM memory cell formed in the MRAM region 44. Each memory cell includes an access transistor with source and drain regions formed in the substrate 41 and the gate electrode 43 formed between the source and the drain regions.

In the present embodiment, the storage element of each memory cell is formed in a layer 50 between the third metal layer (M3) and the fourth metal layer (M4). The layer 50 is a dielectric layer, such as a silicon oxide layer. During the fabrication process, the third metal layer M3 is deposited and patterned. In one example, the metal layer M3 is a copper layer and the metal layer M3 is formed by a damascene process where a dielectric layer is patterned, and the copper layer is deposited into openings in the dielectric layer to form the metal layer M3. Subsequently, the dielectric layer 50, also referred to as an interlayer dielectric layer, is deposited to cover the semiconductor structure. In the present embodiment, the dielectric layer 50 is then patterned by a via mask to form via openings in memory cells where conductive vias or magnetic storage elements are desired. In particular, the via mask patterns via openings in the dielectric layer 50 in the ROM 0 memory cell and the MRAM memory cell. No via opening is formed in the ROM 1 memory cell. In the logic region 45, the via mask will be applied to form vias for connecting to metal layer M3 and M4 where applicable.

The fabrication process then fills the via openings with a conductive metal layer, such as copper or tungsten or a composite thereof. The conductive metal layer may be deposited over the surface of the semiconductor structure. After filling the via openings, an etching or chemical mechanical polish (CMP) process may be carried out to remove the conductive metal layer that may be deposited on the top surface of the semiconductor structure. The fabrication process then deposits a layer of magnetic material on the semiconductor structure. In some examples, the magnetic material may be deposited as multiple atomic layers, one on top of the other, to form the ferromagnetic layers and the tunnel barrier layer of the MTJ storage element. In some cases, the magnetic material is deposited on the surface of the semiconductor structure and the ferromagnetic layers and the tunnel barrier layer are selectively formed only on the conductive metal layer in the via openings. Remaining non-reacted magnetic material formed on surfaces other than the via conductive metal may be removed by an etch process.

The fabrication process then applies a MRAM mask to cover the MRAM memory cells, exposing the ROM memory cells. An etching process is performed to remove at least the ferromagnetic layers from the area of the ROM memory cells. Accordingly, the via openings in the ROM 0 memory cells become a conductive vias only while the via openings in the MRAM memory cells become MTJ storage elements. Subsequently, the fourth metal layer M4 is deposited on the dielectric layer 50 and is patterned to form the desired interconnect structure. Subsequent processing forms vias 54 and the final metal layer M5 in the memory device 40. It is instructive to note that annealing steps may be perform to activate the magnetic material deposited to form the ferromagnetic layers of the MTJ storage element. Annealing, cleaning and other standard fabrication process steps are omitted from this description to simplify the discussion.

As thus configured, the memory device 40 is fabricated to include different memory types by using the via mask to define via openings in which either a MTJ storage element or a conductive via is formed. More specifically, a MRAM memory cell is formed by providing magnetic material on the conductive layer formed in the via opening in the dielectric layer 50 to form a MTJ storage element, denoted by the dotted circle 56. In some embodiments, the magnetic material includes a first ferromagnetic layer to form the magnetic reference layer, sometimes referred to as the pinned layer, a non-magnetic insulating layer as the tunnel barrier layer, and a second ferromagnetic layer to form the magnetic free layer. In the MRAM memory cell, the access transistor is connected to the magnetic reference layer of the MTJ storage element. More specifically, the drain of the access transistor is connected to the magnetic reference layer while the source of the access transistor is connected to the common source line. The magnetic free layer of the MTJ storage element is connected to the bit line BL formed in the fifth metal layer M5. The MTJ storage element has a low resistance state (RL) and a high resistance state (RH) as a function of the magnetic orientation of the magnetic free layer relative to the magnetic reference layer.

Meanwhile, a ROM memory cell is realized by a conductive via in the layer 50, or the absence thereof, as the storage element. In particular, the ROM 1 memory cell is formed by omitting the conductive via between metal layers M3 and M4, denoted by the dotted circle 57. In other words, the ROM storage element for a ROM 1 memory cell is an open circuit. With the connection between the metal layers M3 and M4 being an open circuit, the resistance value between the metal layers M3 and M4, and therefore the resistance observed at the BL (metal layer M5), is very large. The resistance of the ROM 1 memory cell is denoted as an infinite resistance or $R_\infty$ in the present description to represent the resistance of an open circuit. On the other hand, the ROM 0 memory cell is formed by providing a conductive via as the ROM storage element between metal layers M3 and M4, denoted by the dotted circle 55. The connection between the metal layers M3 and M4 is an electrical short circuit and the resistance value between the metal layers M3 and M4, and therefore the resistance observed at the BL (metal layer M5), is very small. The resistance of the ROM 0 memory cell is denoted as R0 in the present description to represent the resistance of a short circuit. In the ROM memory cells, the drain of the access transistor is either connected to the bit line through the conductive via or the drain and bit line connection is an open circuit.

As described above, the MRAM memory cells may be converted to one-time programmable (OTP) memory cells by the application of a sufficiently high voltage value across the MTJ storage element to cause dielectric break down at the MTJ storage element. In particular, the applied voltage may cause the tunnel barrier layer to breakdown, thereby shorting the MTJ storage element. In some examples, the voltage applied may be 20-30% higher than the write voltage used to program or write the MRAM memory cells. The resulting memory cell with a shorted MTJ storage element will have a resistance of Rx which is much lower than the low resistance state RL of a MRAM memory cell. In operation, the designated MRAM memory cells used for OTP memory cells are first written to a high resistance state (RH). Then selected MRAM memory cells are permanently programmed to the low resistance state (Rx) by application of the sufficiently high voltage to short out the MTJ storage element. The difference between the high resistance state (RH) and the low resistance state (Rx) provides the sense margin of the OTP memory cells. The OTP memory cell can be read out by using the same sense threshold in the sense amplifier as the MRAM memory cells, as will be explained in more detail below. Accordingly, the same basic memory array structure and the same basic fabrication process can be used to form different memory types in the memory device 40.

Figure 7:
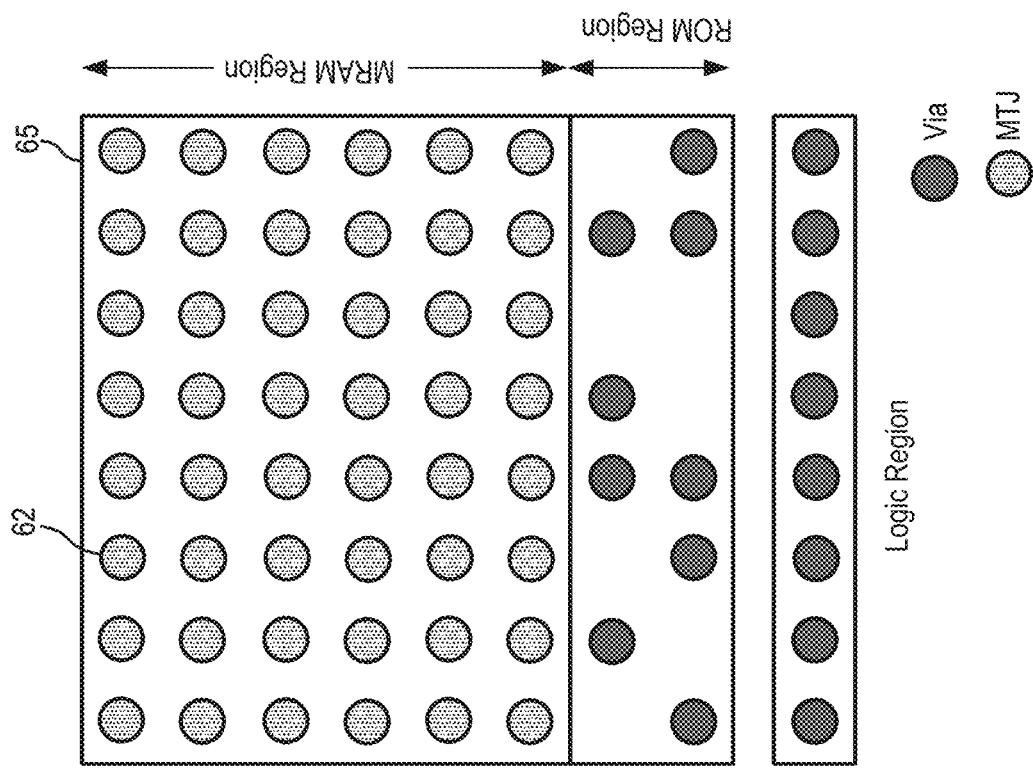
FIG. 7 illustrates the layout of the via mask layer for forming a MRAM region and a ROM region in a memory array in exemplary embodiments of the present invention.
Figure 6:
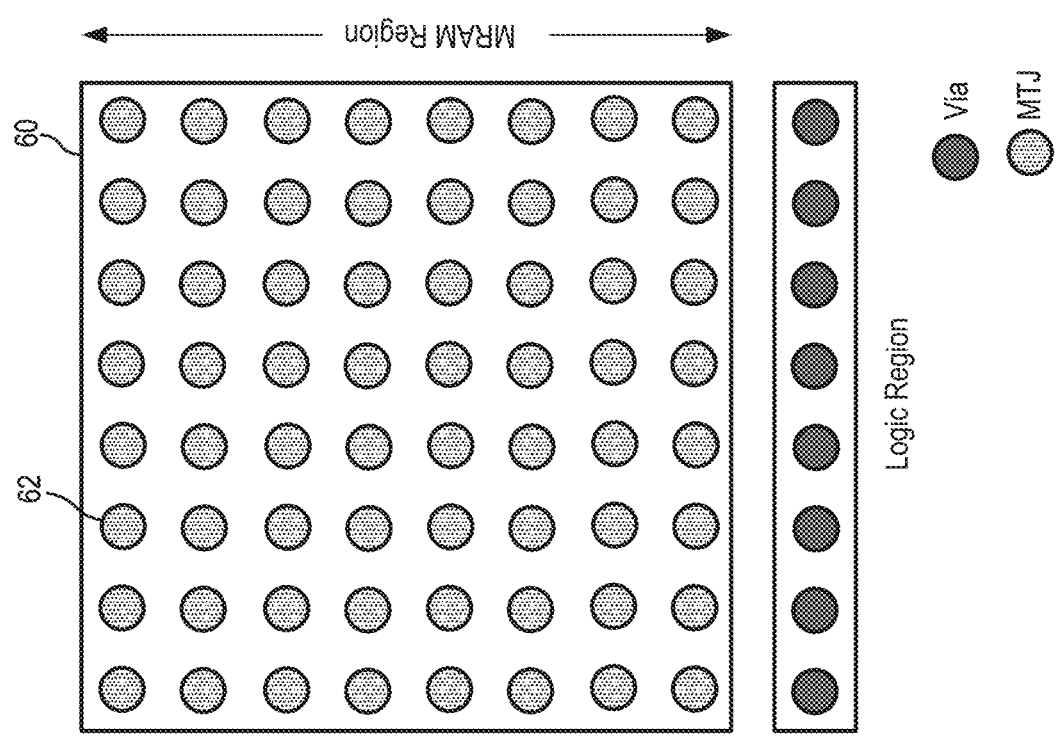
FIG. 6 illustrates the layout of the via mask layer for forming MRAM memory cells in a memory array in exemplary embodiments of the present invention.

FIG. 6 illustrates the layout of the via mask layer for forming MRAM transistors in a memory array in exemplary embodiments of the present invention. FIG. 7 illustrates the layout of the via mask layer for forming a MRAM region and a ROM region in a memory array in exemplary embodiments of the present invention. Referring first to FIG. 6, a via mask 60 defines locations where via openings in the interlayer dielectric layer between metal layers M3 and M4 are to be formed. The via mask 60 is configured to form an array of MRAM memory cells only. Accordingly, the via mask 60 includes a two-dimensional array of openings 62, corresponding to the two-dimensional array of memory cells to be formed on the semiconductor substrate. The via mask 60 also includes via openings 62 in the logic region. In subsequent processing, the via openings 62 are filled with a conductive metal layer followed by forming a layer of magnetic material in the via openings. An MRAM mask is applied to cover the via openings in the MRAM region, leaving the via openings in the logic region exposed. An etch process is then carried out to remove the magnetic material from the exposed area, that is, the logic region. As a result, MTJ storage elements (shown as dot-filled circles) are formed in via openings 62 in the memory array to form MRAM memory cells and conductive vias (shown as solid-filled circles) are formed in via openings 62 in the logic region to form interlayer connections. In the example shown in FIG. 6, the entire memory array is formed as MRAM memory cells.

Referring now to FIG. 7, a via mask 65 defines locations where via openings 62 in the interlayer dielectric layer between metal layers M3 and M4 are to be formed. In this case, the via mask defines a region where MRAM memory cells are to be formed (MRAM region) and a region where ROM memory cells are to be formed (ROM region). Accordingly, the via mask 65 includes a two-dimensional array of openings 62 in the MRAM region, corresponding to the two-dimensional array of memory cells to be formed on the semiconductor substrate. The via mask 65 further includes via openings 62 at selected locations in the ROM region where the via openings define locations where a ROM memory cell with a first logical state (e.g. logical "0") is to be formed. The via mask 65 does not define any via openings at locations where ROM memory cells of the second logical state (e.g. logical "1") are to be formed. That is, without the mask 65 defining an opening 62 at certain memory cell locations, no conductive via will be formed at those memory cell locations and the ROM memory cells will be set to the second logical state. The via mask 65 also includes via openings 62 in the logic region. In subsequent processing, the via openings 62 are filled with a conductive metal layer followed by forming a layer of magnetic material in the via openings. An MRAM mask is applied to cover the via openings in the MRAM region, leaving the via openings in the ROM region and the logic region exposed. An etch process is then carried out to remove the magnetic material from the exposed area, that is, the ROM region and the logic region. As a result, MTJ storage elements (shown as dot-filled circles) are formed in via openings 62 in the MRAM region of the memory array to form MRAM memory cells and conductive vias (shown as solid-filled circles) are formed in via openings 62 in the ROM region to define the read-only memory data. Conductive vias are also formed in via openings 62 in the logic region to form interlayer connections.

Figure 8:
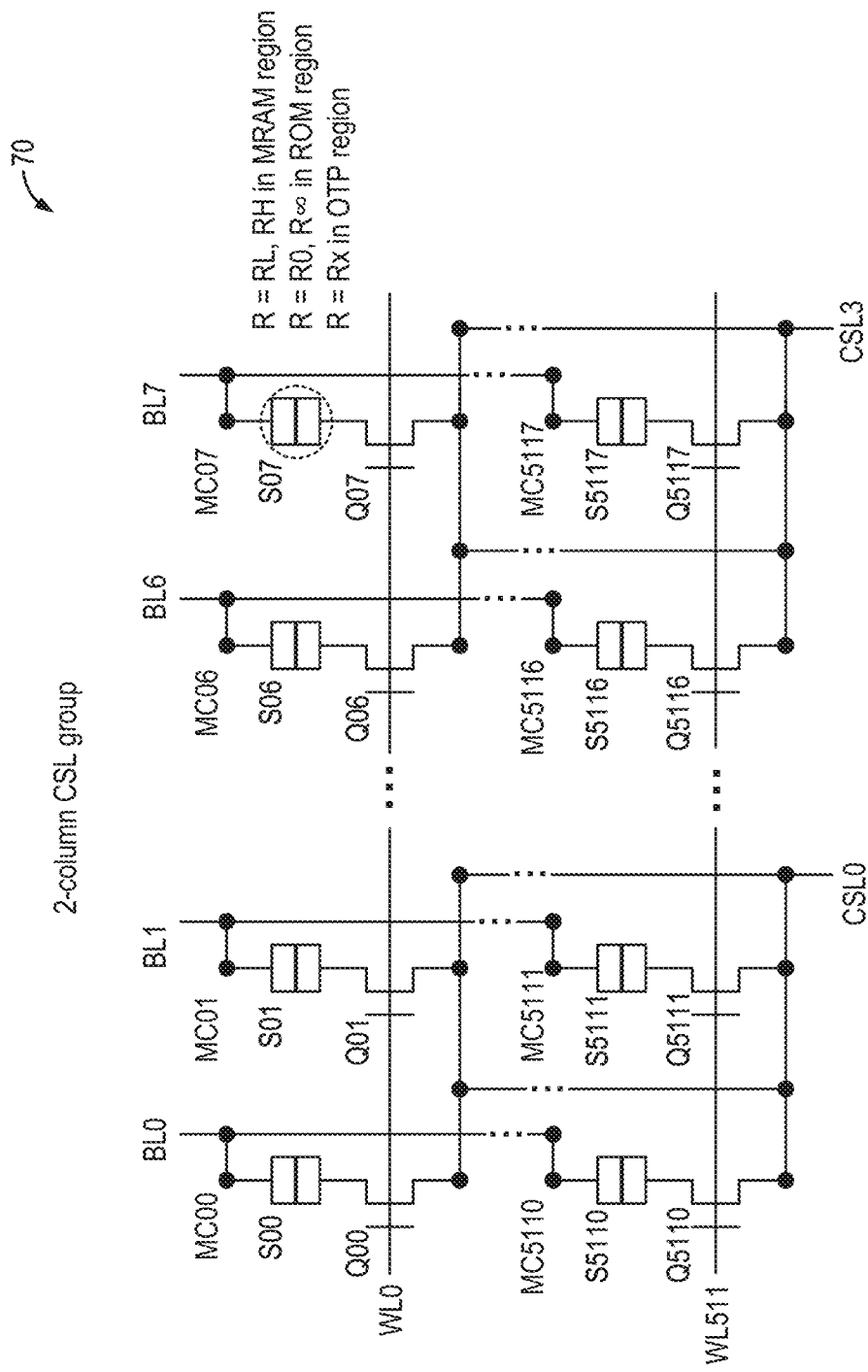
FIG. 8 is a representative circuit diagram illustrating MRAM memory cells in a memory device organized as 2-column common source line groups in embodiments of the present invention.

FIG. 8 is a representative circuit diagram illustrating memory transistors in a memory device organized as 2-column common source line groups in embodiments of the present invention. Referring to FIG. 8, as a result of the unified memory architecture, the memory cells in the memory device 70 assumes a regular structure and appear as the same memory cell to the memory peripheral circuit. In particular, each memory cell includes an access transistor Qn connected to a storage element Sn. For example, for memory cell MC00, the source of the access transistor Q00 is connected to the common source line CSL0 and the drain of the access transistor Q00 is connected to a first terminal of the storage element S00. The gate of the access transistor Q00 is connected to the word line WL0. The word line signal WL0 is asserted to turn on the access transistor Q00 to select the memory cell MC00. The storage element S00 has a second terminal connected to the bit line BL0.

In the present example, FIG. 8 illustrates memory cells arranged in a 2-column common source line group. The operation of the 2-column common source line group is described here for ease of understanding the circuit operation of the inventive unified memory architecture. In FIG. 8, each two columns (or two bit lines) of memory cells are connected to a common source line CSLn. Accordingly, in an array of eight bit lines, four common source line groups are formed. The present illustration depicts a first CSL group (CSL0) including bit lines BL0 and BL1 and a fourth CSL group (CSL3) including bit lines BL6 and BL7. In each CSL group, each of the bit lines is coupled to multiple memory cells, selected by respective word lines. In the present illustration, each BL is coupled to 512 memory cells, selected by word lines WL0 to WL511.

As described above, the memory device 70 may include different memory types. In the case the memory cell is a MRAM memory cell, the storage element Sn is a MTJ storage element where the first terminal is typically the magnetic reference layer and the second terminal is the magnetic free layer. In the case the memory cell is a ROM memory cell, the storage element Sn is a conductive via or the lack of a conductive via. The first terminal is one end of the conductive via or the open circuit and the second terminal is the other end of the conductive via or the open circuit.

As thus configured, the MRAM memory cells in the memory device 70 can be written to a low resistance state (logical 0) and a high resistance state (logical 1) by application of appropriate voltages. The MRAM memory cells and the ROM memory cells can be read by the application of appropriate bias voltages to the source lines and the bit lines and using the appropriate sensing threshold. In some embodiments, the memory cells can be read by using a sensing threshold to distinguish between the low and high resistance states of the MRAM memory cells and the short and open circuits of the ROM memory cells.

Table 1 below illustrates the operating voltage conditions which can be applied to read from the memory array of memory device 70 and also to write a logical 1 and a logical 0 to the MRAM memory cells in the memory array in some examples. In one example, the operating voltage conditions described in the aforementioned Chih's paper can be used. The voltage conditions in Table 1 assumes read or write operation being performed on memory cell MC00, connected to bit line BL0 and word line WL0. It is instructive to note that inhibit voltages (VINHIBIT) are applied to prevent cell disturb to unselected memory cells, as is understood by one skilled in the art.

TABLE 1

| Mode | READ | WRITE0 | WRITE1 |
| --- | --- | --- | --- |
| WL0 | VREG_R | VREG_W0 | VREG_W1 |
| WL[1:511] | VNEG | VNEG | VNEG |
| BL0 | VRBL | VPP | 0 V |
| BL1 | 0 V | 0 V | VPP |
| BL6 | 0 V | VINHIBIT | VINHIBIT |
| BL7 | 0 V | VINHIBIT | VINHIBIT |
| CSL0 | 0 V | 0 V | VPP |
| CSL3 | 0 V | VINHIBIT | VINHIBIT |

As shown in Table 1, different operating voltage conditions are used for writing a logical 0 and writing a logical 1 into the MRAM memory cell MC00. In particular, the voltage applied to word line WL0, the voltages applied to the bit lines BL0 and BL1 in the same CSL group, and the voltage applied to the source line CSL0 are different depending on the logical value to be written. In particular, when writing a logical 0 (low resistance state) to the MRAM memory cell MC00, the bit line current is going from the top (BL) to the bottom (CSL). Meanwhile, when writing a logical 1 (high resistance state) to MRAM memory cell MC00, the bit line current is going from the bottom (CSL) to the top (BL).

Figure 9:
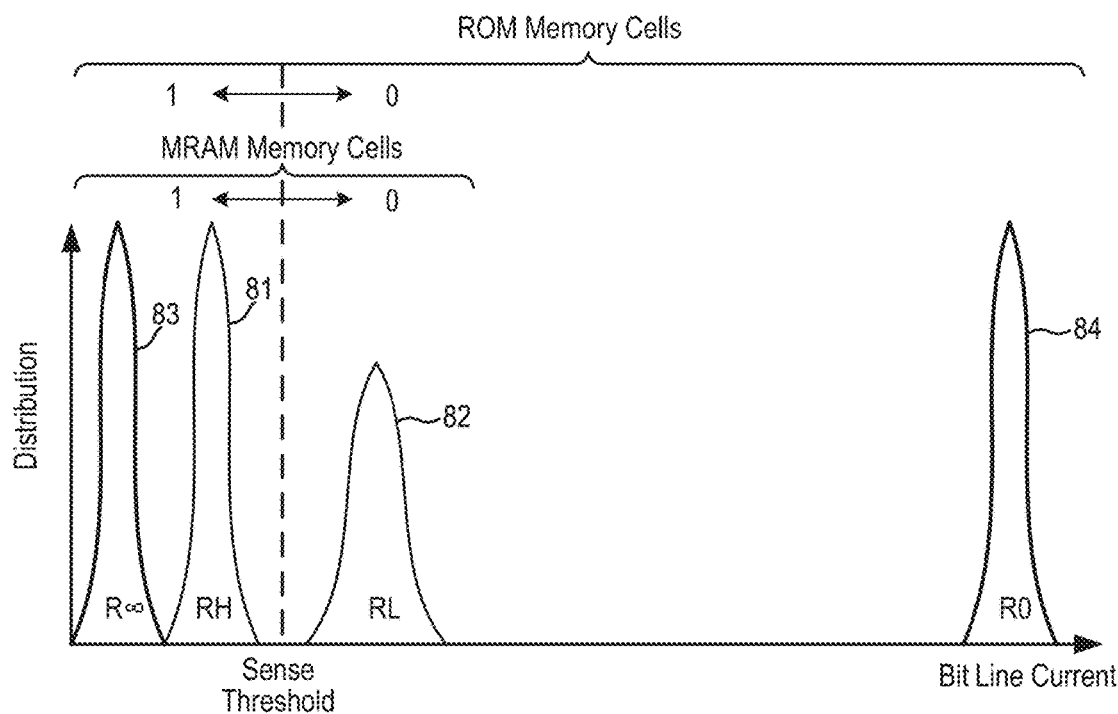
FIG. 9 illustrates the sense current distribution of MRAM memory cells and ROM memory cells formed in a memory device implementing the unified memory architecture in some embodiments.

To perform a read operation from memory cell MC00, three voltages are applied: voltage VREG_R to word line WL0, voltage VNEG to all the other word lines and a read bias voltage VRBL to bit line BL0. All other bit lines and the source line are set to the ground voltage (0V). The appropriate sensing threshold is used in the sense amplifier to detect the bit line current, and therefore the resistance state, of the selected memory cell, whether MRAM memory cell or ROM memory cell. FIG. 9 illustrates the sense current distribution of MRAM memory cells and ROM memory cells formed in a memory device implementing the unified memory architecture in some embodiments. Referring to FIG. 9, with the bit line of the selected memory cell biased to the read bias voltage (VRBL), a bit line current flows in the selected bit line which can be sensed to determine the logical state of the selected memory cell, with the appropriate selection of sense threshold. The sense current margin for a MRAM memory cell is determined by the bit line current value at the high resistance state (curve 81) and the low resistance state (curve 82). Meanwhile, the sense current margin for a ROM memory cell is determined by the bit line current value at the open circuit state (curve 83) and the short circuit state (curve 84). As depicted in FIG. 9, the sense margin for the ROM memory cell is much larger than the sense margin for the MRAM memory cell. Therefore, by selecting a sense threshold that can distinguish between the high and low resistance states of the MRAM memory cell, the ROM memory cell will be easily read using the same sense threshold without any modification.

In embodiments of the present invention, the memory device may assign some of the MRAM memory cells to use as OTP memory cells by breaking down the dielectric tunnel barrier layer in the MTJ storage element using a write bias voltage that exceeds the MTJ storage element's breakdown voltage. The resulting OTP memory cell will have a resistance value of Rx, which is smaller than the low resistance state RL of a MRAM memory cell.

Table 2 below illustrates the operating voltage conditions which can be applied to read from the memory array of memory device 70, to write a logical 1 and a logical 0 to the MRAM memory cells and also to program an MRAM memory cell to a permanent logical state, thereby converting the MRAM memory cell to an OTP memory cell. The voltage conditions in Table 2 assumes read or write operation being performed on MRAM memory cell MC00, connected to bit line BL0 and word line WL0. It is instructive to note that inhibit voltages (VINHIBIT) are applied to prevent cell disturb to unselected memory cells, as is understood by one skilled in the art.

TABLE 2

| | | MRAM Write | | OTP Write | |
|---|---|---|---|---|---|
| Mode | READ | WRITE0 | WRITE1 | WRITE0 | WRITE1 |
| WL0 | VREG_R | VREG_W0 | VREG_W1 | VREG_W0 | VREG_W1 |
| WL[1:511] | VNEG | VNEG | VNEG | VNEG | VNEG |
| BL0 | VRBL | VPP | 0 V | VPPH | 0 V |
| BL1 | 0 V | 0 V | VPP | 0 V | VPP |
| BL6 | 0 V | VINHIBIT | VINHIBIT | VINHIBIT | VINHIBIT |
| BL7 | 0 V | VINHIBIT | VINHIBIT | VINHIBIT | VINHIBIT |
| CSL0 | 0 V | 0 V | VPP | 0 V | VPP |
| CSL3 | 0 V | VINHIBIT | VINHIBIT | VINHIBIT | VINHIBIT |

In particular, MRAM memory cells designated to be OTP memory cells are first written to a high resistance state, such as using the WRITE1 conditions in Table 2. Then to program a selected OTP memory cell into the permanent logical state, a higher write voltage VPPH is applied to the bit line to break down the tunnel barrier layer in the MTJ storage element. In one example, the VPP voltage to write a MRAM memory cell to the low resistance state (WRITE0) is 2V and the VPPH voltage to program an OTP memory cell is 2.5V to 3V. Once the MTJ storage element is shorted (resistance Rx), the MTJ storage element will not recover and the memory cell is permanently set to the logical state associated with resistance Rx (e.g. logical "0").

Figure 10:
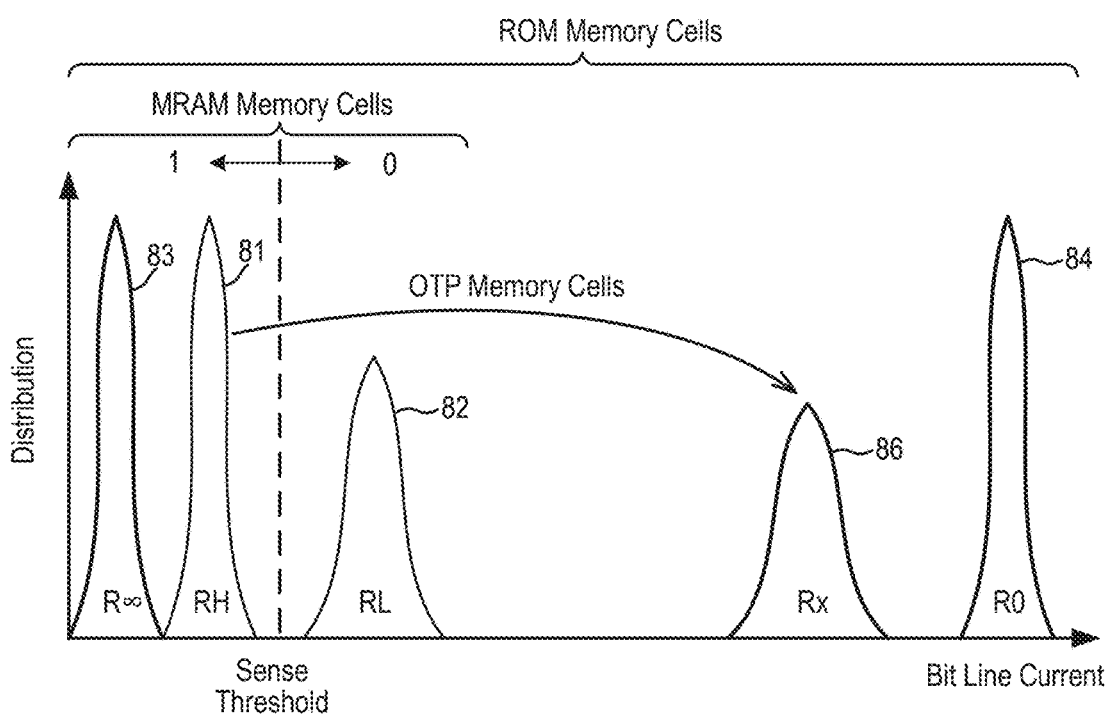
FIG. 10 illustrates the sense current distribution of MRAM memory cells, ROM memory cells and OTP memory cells formed in a memory device implementing the unified memory architecture in some embodiments.

FIG. 10 illustrates the sense current distribution of MRAM memory cells, ROM memory cells and OTP memory cells formed in a memory device implementing the unified memory architecture in some embodiments. Referring to FIG. 10, the sense current margin for a MRAM memory cell is determined by the bit line current value at the high resistance state (curve 81) and the low resistance state (curve 82). Meanwhile, the sense current margin for a ROM memory cell is determined by the bit line current value at the open circuit state (curve 83) and the short circuit state (curve 84). The sense current margin for an OTP memory cell is determined by the bit line current at the high resistance state (curve 81) and the programmed low resistance state (curve 86) having a resistance of Rx. For the OTP memory cell, the high resistance state (RH) can be referred to as the unprogrammed state while the low resistance state (Rx) is referred to as the programmed state, which is permanent and not reversible.

To read the memory cells, the same sense threshold can be used to distinguish between the high and low and open and short resistance states of the MRAM memory cells and ROM memory cells as well as the unprogrammed and programmed state of the OTP memory cells. As depicted in FIG. 10, the sense margin for the ROM memory cell is much larger than the sense margin for the MRAM memory cell and the sense margin for the OTP memory cell is also much larger than the sense margin for the MRAM memory cell. Therefore, by selecting a sense threshold that can distinguish between the high and low resistance states of the MRAM memory cell, the ROM memory cell and the OTP memory cell will be easily read using the same sense threshold without any modification.

In this detailed description, process steps described for one embodiment may be used in a different embodiment, even if the process steps are not expressly described in the different embodiment. When reference is made herein to a method including two or more defined steps, the defined steps can be carried out in any order or simultaneously, except where the context dictates, or specific instruction otherwise are provided herein. Further, unless the context dictates or express instructions otherwise are provided, the method can also include one or more other steps carried out before any of the defined steps, between two of the defined steps, or after all the defined steps In this detailed description, various embodiments or examples of the present invention may be implemented in numerous ways, including as a process; an apparatus; a system; and a composition of matter. A detailed description of one or more embodiments of the invention is provided above along with accompanying figures that illustrate the principles of the invention. The invention is described in connection with such embodiments, but the invention is not limited to any embodiment. Numerous modifications and variations within the scope of the present invention are possible. The scope of the invention is limited only by the claims and the invention encompasses numerous alternatives, modifications, and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. The present invention is defined by the appended claims.

The invention claimed is:

1. A semiconductor memory device, comprising:
   a semiconductor substrate comprising a first memory region, a second memory region and a logic region;
   a flash memory array formed in the first memory region and comprising an array of magnetoresistive random-access (MRAM) memory cells, each MRAM memory cell including an access transistor coupled to a magnetic tunnel junction (MTJ) storage element;
   a read-only memory (ROM) array formed in the second memory region, the read-only memory array comprising an array of read-only (ROM) memory cells, each ROM memory cell including an access transistor coupled to a short or open circuit as the ROM storage element;
   a memory peripheral circuit formed in the logic region, the memory peripheral circuit including control circuits for receiving input commands and executing memory operations to the memory cells in the flash memory array and the ROM array;
   a plurality of metal layers formed on the semiconductor substrate, each metal layer being isolated from an adjacent metal layer by an interlayer dielectric layer,
   wherein the MTJ storage element of each MRAM memory cell is formed in a via opening formed in the interlayer dielectric layer between a first one of the metal layers and a second one of the metal layers; and
   wherein the ROM storage element of each ROM memory cell is formed in the interlayer dielectric layer between the first one of the metal layers and the second one of the metal layers as a conductive via or the absence of a conductive via, the conductive via forming a short circuit ROM storage element and the absence of a conductive via forming an open circuit ROM storage element.

2. The semiconductor memory device of claim 1, wherein each MRAM memory cell has a first logical state associated with a low resistance state of the MTJ storage element and a second logical state associated with a high resistance state of the MTJ storage element; and each ROM memory cell is configured to a first logical state associated with a short circuit as the ROM storage element or is configured to a second logical state associated with an open circuit as the ROM storage element.

3. The semiconductor memory device of claim 2, wherein the memory peripheral circuit comprises a sense amplifier for sensing read data from the non-volatile memory array and the read-only memory array, the sense amplifier applying a first sense threshold to distinguish the low resistance state of the MRAM memory cells and the short circuit of the ROM memory cells from the high resistance state of the MRAM memory cells and the open circuit of the ROM memory cells.

4. The semiconductor memory device of claim 3, wherein the MRAM memory cells have a first sense margin being the difference between the low resistance state and the high resistance state of the MTJ storage element, and the ROM memory cells have a second sense margin being the difference between the open circuit and the short circuit of the ROM storage element, the second sense margin being greater than the first sense margin.

5. The semiconductor memory device of claim 1, wherein the access transistors of the MRAM memory cells and the ROM memory cells are formed in or on the semiconductor substrate, wherein each access transistor comprises a source region and a drain region formed spaced apart in the semiconductor substrate, and a gate electrode formed on the semiconductor substrate between the source region and the drain region, the gate electrode being isolated from the semiconductor substrate by a gate dielectric layer.

6. The semiconductor memory device of claim 5, wherein each MTJ storage element comprises a first ferromagnetic layer and a second ferromagnetic layer, separated by a non-magnetic insulating layer, the first ferromagnetic layer having a fixed magnetization to a particular polarity and the second ferromagnetic layer having a magnetization that can be changed in response to an applied electric field.

7. The semiconductor memory device of claim 6, wherein the source region of each access transistor is coupled through one or more of the metal layers to a source line to receive a source line voltage, the gate electrode of each access transistor is coupled through one or more of the metal layers to receive a word line signal, and the drain region of each access transistor is coupled through one or more metal layers to a first terminal of the MTJ storage element or a first terminal of the ROM storage element, a second terminal of the MTJ storage element or a second terminal of the ROM storage element being coupled through one or more metal layers to a bit line.

8. The semiconductor memory device of claim 7, wherein the second terminal of the MTJ storage element coupled to the bit line comprises the second ferromagnetic layer.

9. The semiconductor memory device of claim 1, wherein each ROM storage element comprises a conductive via or the absence of a conductive via formed in the interlayer dielectric layer between the first one of the metal layers and the second one of the metal layers, the conductive via being filled with a conductive metal layer.

10. The semiconductor memory device of claim 9, wherein the conductive metal layer comprises copper or tungsten or a composite thereof.

11. The semiconductor memory device of claim 1, wherein the first memory region and the second memory region are defined by a via mask defining via openings in the interlayer dielectric layer between the first one of the metal layers and the second one of the metal layers, the via mask defining via openings in the first memory region to form MRAM memory cells and defining via openings in the second memory region to form ROM memory cells having a short circuit as the storage element, and the via mask does not define via openings in the second memory region to form ROM memory cells having the open circuit as the storage element.

12. The semiconductor memory device of claim 3, wherein the semiconductor substrate further comprises a third memory region, and the memory device further comprising:
   a one-time programmable memory array formed in the third memory region, the one-time programmable memory array comprising an array of MRAM memory cells, each MRAM memory cell including an access transistor coupled to a magnetic tunnel junction (MTJ) storage element,
   wherein one or more MRAM memory cells in the one-time programmable memory array are programmed to a permanent logical state to function as a one-time programmable (OTP) memory cell; and
   wherein the memory peripheral circuit receives input commands and executes memory operations to the memory cells in the non-volatile memory array, the read-only memory array and the one-time programmable memory array.

13. The semiconductor memory device of claim 12, wherein each MTJ storage element comprises a first ferromagnetic layer and a second ferromagnetic layer, separated by a non-magnetic insulating layer, and wherein a selective MRAM memory cell in the one-time programmable memory array is programmed to the permanent logical state by application of a bias voltage to break down the non-magnetic insulating layer to electrically short the first ferromagnetic layer and the second ferromagnetic layer.

14. The semiconductor memory device of claim 13, wherein the bias voltage is greater than a voltage to change the magnetization direction of the MTJ storage element.

15. The semiconductor memory device of claim 13, wherein the OTP memory cell has a first logical state associated with a first resistance value and a second logical state associated with a second resistance value, the second resistance value being the high resistance state of the MRAM memory cell, the first resistance value being much lower than the low resistance state of the MRAM memory cell.

16. The semiconductor memory device of claim 15, wherein the first resistance value is greater than a resistance value of the short circuit of the ROM memory cells.

17. The semiconductor memory device of claim 15, wherein the sense amplifier of the memory peripheral circuit applies the first sense threshold to distinguish the low resistance state of the MRAM memory cells the short circuit of the ROM memory cells from the high resistance state of the MRAM memory cells and the open circuit of the ROM memory cells, the peripheral circuit further applying the first sense threshold to distinguish the first resistance value of the OTP memory cells from the second resistance value of the OTP memory cells.

18. The semiconductor memory device of claim 1, wherein the memory peripheral circuit comprises a row peripheral circuit and a column peripheral circuit, the row peripheral circuit comprising row address decoders and word line drivers and the column peripheral circuit comprising column address decoders, bit line drivers and sense amplifiers.

19. The semiconductor memory device of claim 1, wherein the first memory region comprises a two-dimensional array of MRAM memory cells formed on the semiconductor substrate with the MTJ storage elements of the MRAM memory cells being arranged in a direction perpendicular to a surface of the semiconductor substrate, and the second memory region comprises a two-dimensional array of ROM memory cells formed on the semiconductor substrate with the ROM storage elements of the ROM memory cells being arranged in the direction perpendicular to the surface of the semiconductor substrate.

20. A semiconductor memory device, comprising:
a semiconductor substrate comprising a first memory region, a second memory region and a logic region;
a flash memory array formed in the first memory region and comprising an array of magnetoresistive random-access (MRAM) memory cells, each MRAM memory cell including an access transistor coupled to a magnetic tunnel junction (MTJ) storage element;
a read-only memory (ROM) array formed in the second memory region, the read-only memory array comprising an array of read-only (ROM) memory cells, each ROM memory cell including an access transistor coupled to a short or open circuit as the ROM storage element; and
a memory peripheral circuit formed in the logic region, the memory peripheral circuit including control circuits for receiving input commands and executing memory operations to the memory cells in the flash memory array and the ROM array,
wherein each MRAM memory cell has a first logical state associated with a low resistance state of the MTJ storage element and a second logical state associated with a high resistance state of the MTJ storage element; and each ROM memory cell is configured to a first logical state associated with a short circuit as the ROM storage element or is configured to a second logical state associated with an open circuit as the ROM storage element.

* * * * *